United States Patent [19]

Isley

[11] Patent Number: 4,738,291
[45] Date of Patent: Apr. 19, 1988

[54] POWER SAW INCLUDING REMOVABLE CIRCULAR CUTTING ELEMENT AND HOLDER

[76] Inventor: Reggald E. Isley, #9024-108th Street, Grande Prairie, Alberta, Canada, T8V 4C8

[21] Appl. No.: 24,854

[22] Filed: Mar. 16, 1987

Related U.S. Application Data

[63] Continuation of Ser. No. 728,254, Apr. 29, 1985, abandoned.

[51] Int. Cl.[4] ............................................. A016 23/08
[52] U.S. Cl. ................................... 144/34 R; 83/853; 144/3 D; 144/223; 144/236; 144/241; 407/113
[58] Field of Search ................... 144/3 D, 34 R, 336, 144/223, 235, 236, 241; 83/853; 407/7, 46, 113, 115, 118

[56] References Cited

U.S. PATENT DOCUMENTS 2,630,725  3/1953  Black .......................... 407/113 UX
3,213,716  10/1965  Getts .......................... 407/113 UX
3,953,915  5/1976  Fawcett ............................. 407/113
4,164,329  8/1979  Higby ................................ 407/113
4,222,298  9/1980  James ................................ 83/853
4,446,897  5/1984  Kurelek ............................. 144/34

FOREIGN PATENT DOCUMENTS

731892  6/1932  France ................................ 83/853

Primary Examiner—W. Donald Bray
Attorney, Agent, or Firm—Kenneth S. Klarquist; James Campbell; James S. Leigh

[57] ABSTRACT

A power saw having a stationary, tree-supporting platform disc, a rotatable tree cutting disc and drive means for rotating the cutting disc. The saw cutting elements have circular, conical or concave cutting faces with circumferential cutting edges. The cutting elements are removably attached to the saw by means of holders which absorb forces imparted to the cutting elements and transmit the forces to the cutting disc. The holders facilitate rapid replacement of dulled or damaged cutting elements.

6 Claims, 7 Drawing Sheets

POWER SAW INCLUDING REMOVABLE CIRCULAR CUTTING ELEMENT AND HOLDER

This application is a continuation of application Ser. No. 728,254, filed Apr. 29, 1985, now abandoned.

FIELD OF THE INVENTION

This invention pertains to power saws for falling trees. In particular, the invention provides a power saw having a rotatable cutting disc with a plurality of removable cutting elements disposed around the outer rim of the disc. The cutting elements have circular, conical or concave cutting faces and circumferencial cutting edges.

BACKGROUND OF THE INVENTION

Manipulable powered apparatus termed "tree falling heads" are used in tree falling operations. Conventional tree falling heads include grapple arms for holding the tree while it is cut and a power saw for cutting the tree. The present application is particularly concerned with tree falling heads having circular power saws which can be designed to provide a platform upon which the tree is supported while it is cut and upon which the tree may be transported after cutting. Such an arrangement is shown in U.S. Pat. No. 3,915,209 issued Oct. 28, 1975 for an invention of Bernard Denis, in which a cutter-bearing ring is drivingly rotated around the periphery of a support platform. Denis provides a drive gear which is offset to one side of the circular platform/ring assembly and which engages gear teeth provided around the inner circumference of the cutter-bearing ring. A cutter ring suffers a number of disadvantages as compared with a cutter disc. For example, the ring must be precision machined to minimize wear on the drive gear. In practice, because it is difficult to provide adequate support for a cutter ring, the loads to which the ring is subjected affect the ring/drive gear tolerance and cause premature wearing of the drive gear. It is also difficult to lubricate a cutter ring adequately, which further accelerates wear.

U.S. Pat. No. 3,494,389 issued Feb. 10, 1970 for an invention of John L. Thibodeau illustrates a ring saw which is rotated by a drive gear offset to one side of the ring to mesh with gear teeth disposed around the inner circumference of the ring. The offset drive mechanism leaves the ring saw unobstructed over most of its diameter, thereby increasing the size of tree which may be cut with a saw of a given diameter. Unlike Denis, Thibodeau provides no support platform—presumably because his apparatus does not appear to be intended for use in cutting trees, but rather is used for slashing and loading small bundles of timber which apparently do not have to be supported away from the rotating saw while they are cut, as does a tree which would pinch and stall the saw if allowed to rest on the saw during the cutting operation. Since Thibodeau provides no platform to support the tree, his apparatus is unsuited to use in tree falling operations.

A particular problem with prior art power saws concerns the saw cutting elements which must be kept sharp in order to produce an even, clean cut. If the saw cutting elements are dull, they tend to leave a ragged edge and may cause splintering at the severed butt of the tree, seriously degrading the quality of the lumber subsequently produced from the tree and reducing its value, particularly in foreign markets.

Saws having fixed saw teeth of the type shown in the Thibodeau patent are particularly difficult to keep sharp. An experienced saw filer must be engaged to sharpen the saw teeth at regular intervals. If any of the saw teeth are broken or damaged to the point that they cannot be sharpened (a common occurrence, since tree falling heads are operated close to the ground by an operator who may be more than twenty feet away from the saw, thereby significantly increasing the likelihood that the saw may strike a rock or other object and damage the saw teeth), then the remains of the damaged teeth must be removed and new teeth silver-soldered in their place. Thus, Thibodeau's arrangement is undesirable because of the costly labor-intensive process required to sharpen and/or repair the saw teeth. Furthermore, unless an expensive inventory of sharpened saws is maintained, significant down time may be experienced in view of the time required to disassemble the saw and transport it from a remote site of operation to a facility having apparatus and personnel capable of sharpening and/or repairing the saw (or conversely, down time may be experienced in view of the time and cost inherent in transporting such apparatus and personnel to the remote operation site). Although Denis overcomes some of the disadvantages of Thibodeau's arrangement by providing individually replacable cutting teeth with a rather elaborate mechanism for locking each tooth in place around the rim of the saw, his arrangement is undesirable in view of its relative complexity, which increases the overall cost of the saw.

To overcome the foregoing disadvantages, the present invention provides disposable, replacable, self-sharpening cutting elements which are cheap to make and which may be rapidly installed by inexperienced personnel. The teeth are removably attached around the periphery of the cutting disc by holders which have a relatively simple design yet provide massive support capable of withstanding and transmitting to the cutting disc forces imparted to the cutting elements during cutting operations.

SUMMARY OF THE INVENTION

The invention provides a saw cutting element comprising an indented, circular cutting face having a circumferencial cutting edge. Preferably, the cutting face is conical or concave. Advantageously, the cutting element has a tapered rim which narrows the element in the direction away from the cutting face at an angle of about 10° with respect to a line perpendicular to the plane of the cutting edge.

The invention also provides a saw cutting assembly comprising a cutting element having a circular cutting face and a holder for removably holding the cutting element. The holder preferably comprises an anvil for supporting the cutting element opposite the cutting face. Advantageously, the holder also has a recessed shoulder for supporting the cutting element around at least ¼ and preferably about ½ of the circumference of its cylindrically tapered rim. Releasable attaching means are provided for releasably attaching the cutting element to the holder.

The invention further provides a saw comprising an upper, stationary platform disc; a lower, rotatable cutting disc; a plurality of cutting elements disposed around the outer rim of the cutting disc; and, drive means for rotating the cutting disc.

Figure 7:
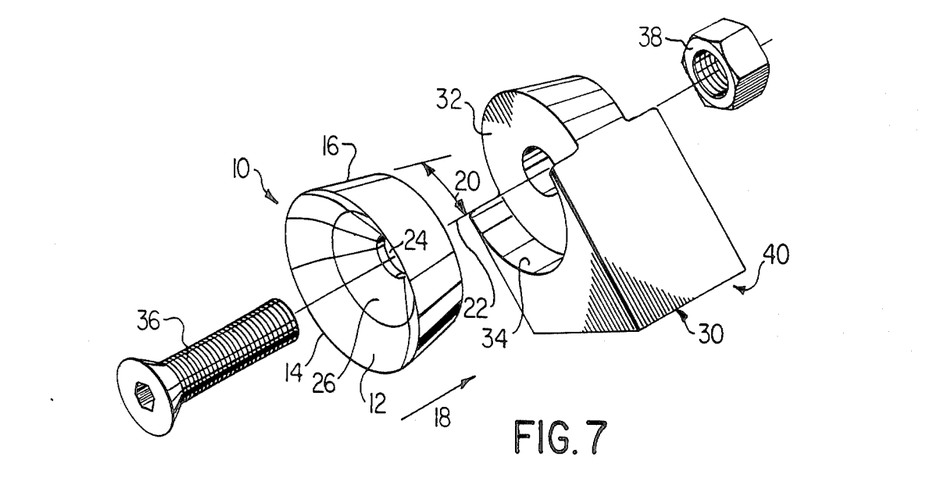
FIG. 7 is an exploded illustration of a cutting assembly according to the invention.
Figure 8:
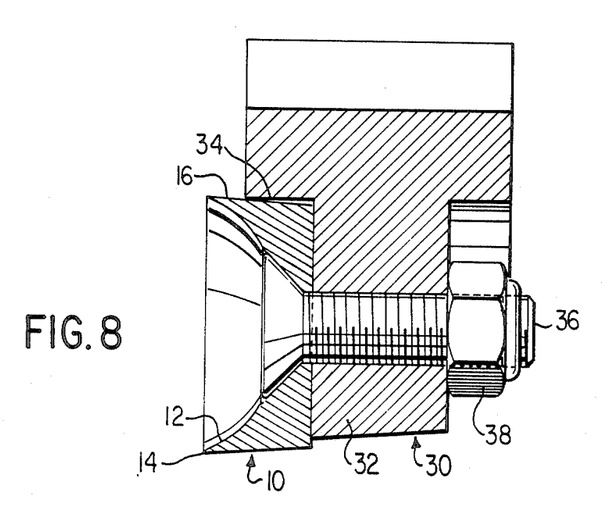
FIG. 8 is a partial cross-sectional side view of the cutting assembly of FIG. 7, showing how the components thereof are assembled.

DETAILED DESCRIPTION OF A PREFERRED EMBODIMENT OF THE INVENTION (a) Cutting Element FIGS. 7 and 8 depict a cylindrically tapered cutting element 10 having an indented (preferably conical or concave) circular cutting face 12 surrounded by a circumferencial cutting edge 14. Element 10 has a rim 16 which is tapered to narrow element 10 in the direction away from cutting face 12 (that is, element 10 becomes narrower in the direction of arrow 18 shown in FIG. 7). Preferably, rim 16 is tapered at an angle 20 of about 10° with respect to a line 22 perpendicular to the plane of cutting edge 14.

An aperture 24 having a counter-bored or countersunk face 26 is provided in cutting element 10 to receive bolt 36 which is for removably attaching cutting element 10 to holder 30 as hereinafter described.

Cutting element 10 is preferably machined from low alloy steel and then case hardened so that element 10 has a hard exterior and a soft core. The inventor has found it preferable not to completely temper element 10 since such elements have exhibited a tendency to shatter during use. The inventor has also found that carbide materials are not well suited for producing element 10 since they are quite brittle and tend to chip if a rock is struck (a common occurrence in tree falling operations).

(b) Cutting Assembly

FIGS. 7 and 8 also show a cutting assembly comprising cutting element 10 as described above and a holder 30 for removably holding element 10. Holder 30 has a relatively massive anvil 32 for supporting element 10 over the face of element 10 which is opposite to cutting face 12. Holder 30 also has a recessed shoulder 34 having the same shape as cylindrically tapered rim 16. Shoulder 34 supports element 10 around at least ¼ and preferably about ½ of the circumference of rim 16.

A releasable attaching means such as bolt 36 and nut 38 are provided for releasably attaching cutting element 10 to holder 30.

In use, the cutting assembly is rigidly affixed to a saw by welding or otherwise firmly attaching face 40 of holder 30 to the saw cutting edge. Anvil 32 and shoulder 34 provide massive support for cutting element 10 capable of widthstanding the forces imparted to element 10 during cutting operations and transmitting the forces to the body of the saw.

If cutting element 10 is dulled or damaged, it can easily be replaced by an unskilled person who need only remove bolt 36 and nut 38 to free the dulled or damaged cutting element and insert a fresh cutting element in its place. It is expected that the cost of producing cutting element 10 may be held low enough that the most economic alternative will be to discard dulled or damaged cutting elements rather than attempt to sharpen or repair them. It should however be noted that cutting element 10 has a self-sharpening feature. Woodchips cut by element 10 tend to curl across cutting face 12 as they travel from the portion of edge 14 which does the cutting to the opposite portion of edge 14. In the preferred saw hereinafter described, when cutting element 10 and holder 30 are fastened to the saw, only about ¼ of circumferencial cutting edge 14 does any cutting and thus only that portion is dulled. As the chips roll across the opposite portion of edge 14, they tend to erode that portion, thereby sharpening it somewhat. By periodically rotating cutting element 10 by about ¼ turn, one may sequentially expose fresh, sharp portions of cutting edge 14 to perform the cutting operation. Such periodic rotation of element 10 eventually positions previously dulled portions of edge 14 opposite the cutting portion of the edge, thereby facilitating self-sharpening of those previously dulled portions in the manner aforesaid.

As mentioned above, woodchips cut by element 10 tend to curl across the surface of cutting face 12. Since large quantities of chips are produced in tree falling operations, every effort should be made to avoid obstructing the movement of the chips and to ensure that they can be rapidly removed from the vicinity of cutting element 10 so as to prevent jamming. For this reason, the head of bolt 36 is recessed beneath the surface of cutting face 12 by counter-boring or counter-sinking face 26 as aforesaid so that the bolt head will not obstruct the chips as they curl across face 12. The manufacturing of element 10 may be simplified if cutting face 12 is made conical, rather than concave. In particular, the conical taper of cutting face 12 may be the same as the taper of counter-bored or counter-sunk face 26, thereby facilitating production of faces 12 and 26 in a single operation yielding a single tapered face.

(c) Saw

Figure 1:
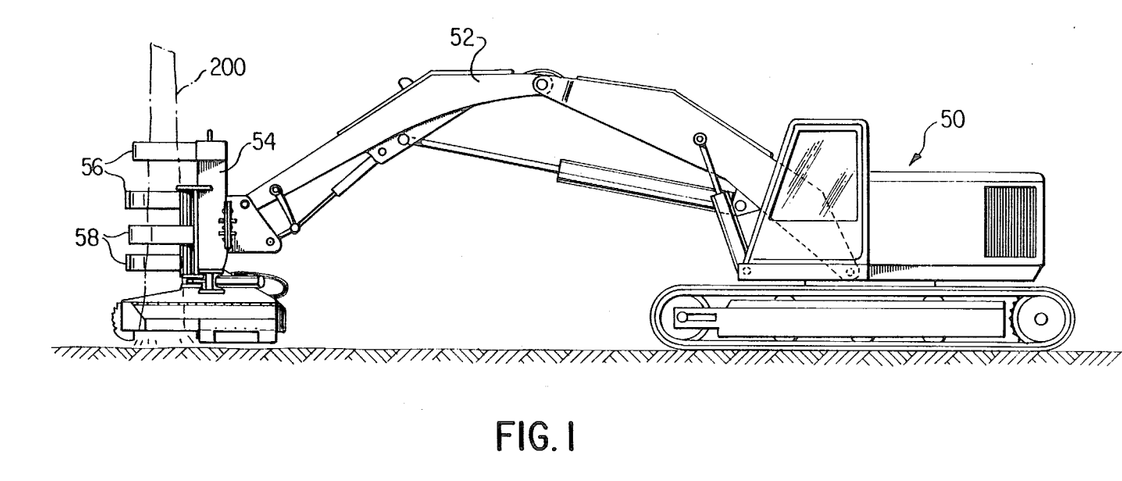
FIG. 1 is a side view of a powered excavator-type apparatus having an arm with a tree falling head supported at the end of the arm.
Figure 2:
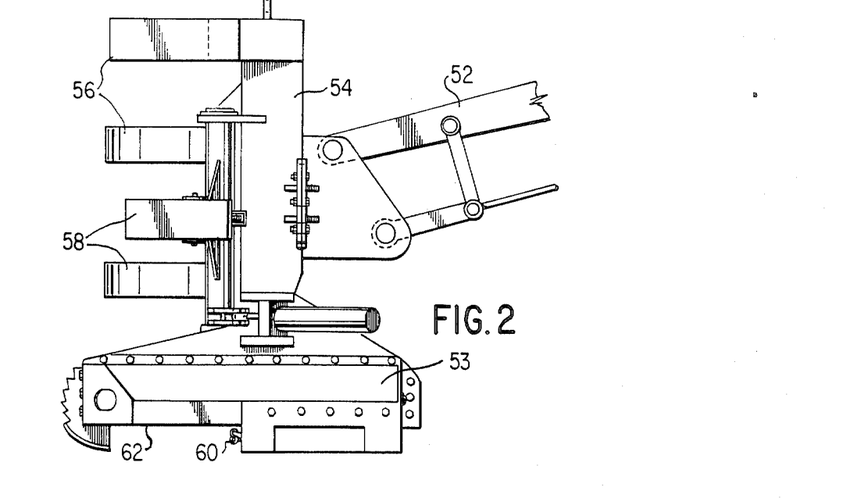
FIG. 2 is a side view of a tree falling head with the power saw thereof in the retracted position.
Figure 3:
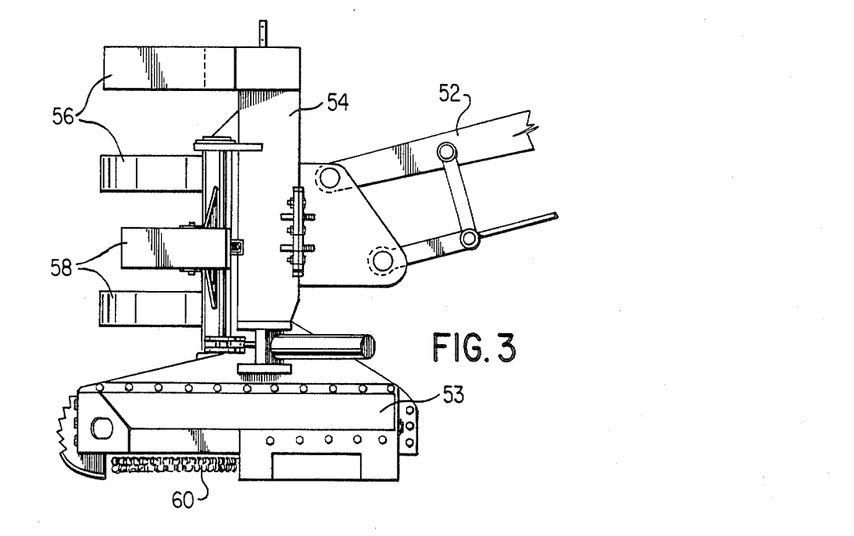
FIG. 3 is similar to FIG. 2, but shows the power saw fully extended.

FIG. 1 illustrates a powered excavator-type apparatus 50 having an arm 52 at the end of which a tree falling head 54 is removably coupled. Tree falling head 54 (shown in greater detail in FIGS. 2 and 3) includes a pair of grapple arms 56, 58 for grappling a tree 200 (FIG. 1) and a circular saw 60 which may be advanced across the base of tree falling head 54 to sever tree 200. In FIG. 2, saw 60 is shown in its fully retracted position. FIG. 3 shows saw 60 fully extended.

Figure 4A:
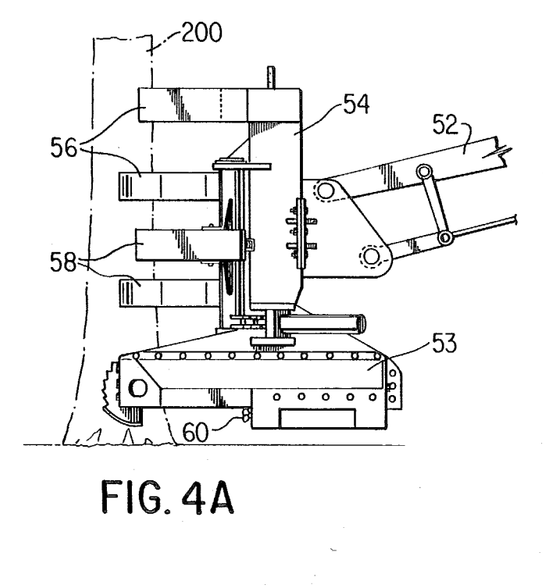
FIGS. 4A through 4D show how the tree falling head is moved into position to grapple a tree and then operated to sever the tree.
Figure 4B:
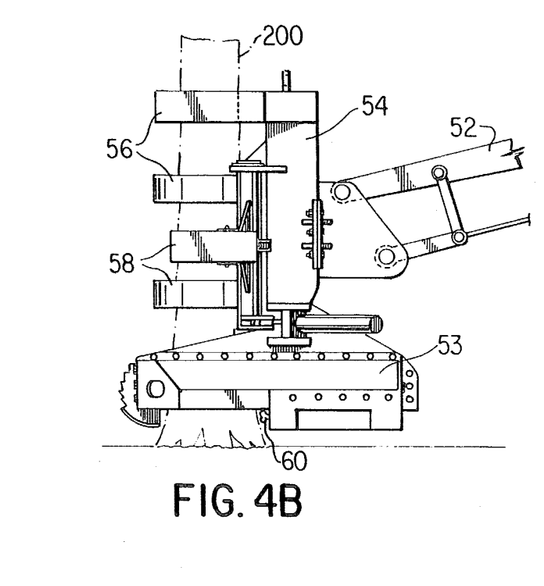
Figure 4C:
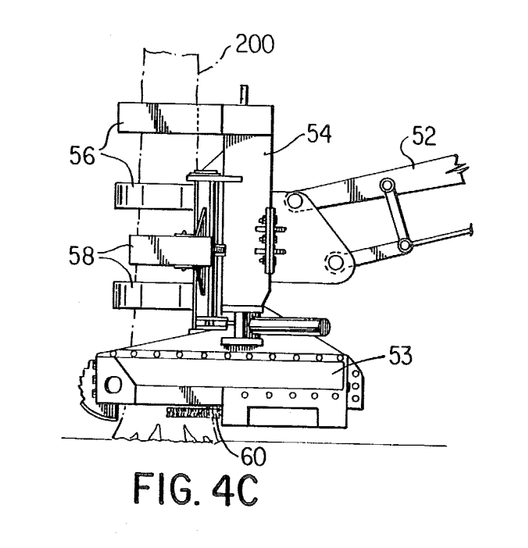
Figure 4D:
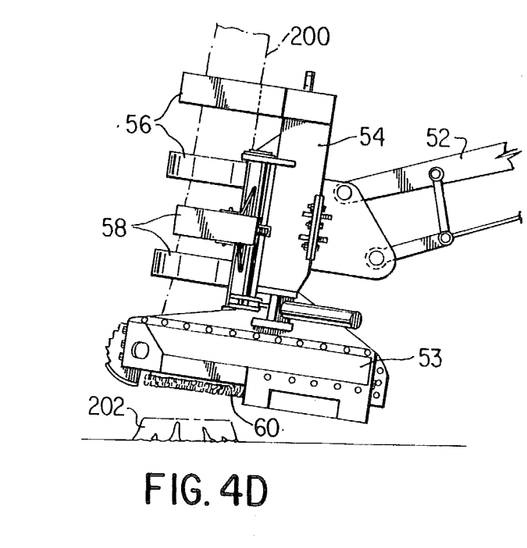

FIGS. 4A through 4D illustrate the tree falling operation. In FIG. 4A, the operator of apparatus 50 has opened grapple arms 56, 58, retracted saw 60 and manipulated arm 52 to position tree falling head 54 at the base of tree 200. In FIG. 4B, the operator has moved arm 52 forward and has closed grapple arms 56, 58 around tree 200. The base of tree 200 is centred within a "U" shaped yoke 53 (best seen in FIG. 5) in the base of tree falling head 54. In FIG. 4C, the operator has actuated a drive motor which rotates saw 60 in the manner hereinafter described in greater detail and has actuated a pair of hydraulic rams (not shown) which gradually advance rotating saw 60 across the base of tree falling head 54 and into tree 200. In FIG. 4D, saw 60 has been fully advanced to completely sever tree 200 from stump 202 and the operator has manipulated arm 52 to lift tree 200 free of stump 202. Saw 60 includes a stationary platform which supports the severed tree. After the tree has been severed, the operator manipulates arm 52 to deposit the tree at any desired location.

Saw 60 (which is shown in greater detail in FIGS. 5 and 6) comprises an upper, stationary platform disc 70 and a lower, rotatable cutting disc 72. A plurality of cutting assemblies of the type described above and each comprising a cutting element 10 and a holder 30 are welded around the outer rim of cutting disc 72. As may be seen in FIG. 6, the cutting assemblies are arranged to protrude alternately above the plane of platform disc 70 and beneath the plane of cutting disc 72. The shaded portions 74 of cutting elements 10 do the actual cutting when saw 60 is rotated. Preferably, no more than about ten to fifteen percent of each of cutting elements 10 (i.e. shaded portions 74) protrude above platform disc 70 or below cutting disc 72 so as to present as little resistance as possible, should the operator wish to withdraw saw 60 from a partially severed tree.

Figure 6:
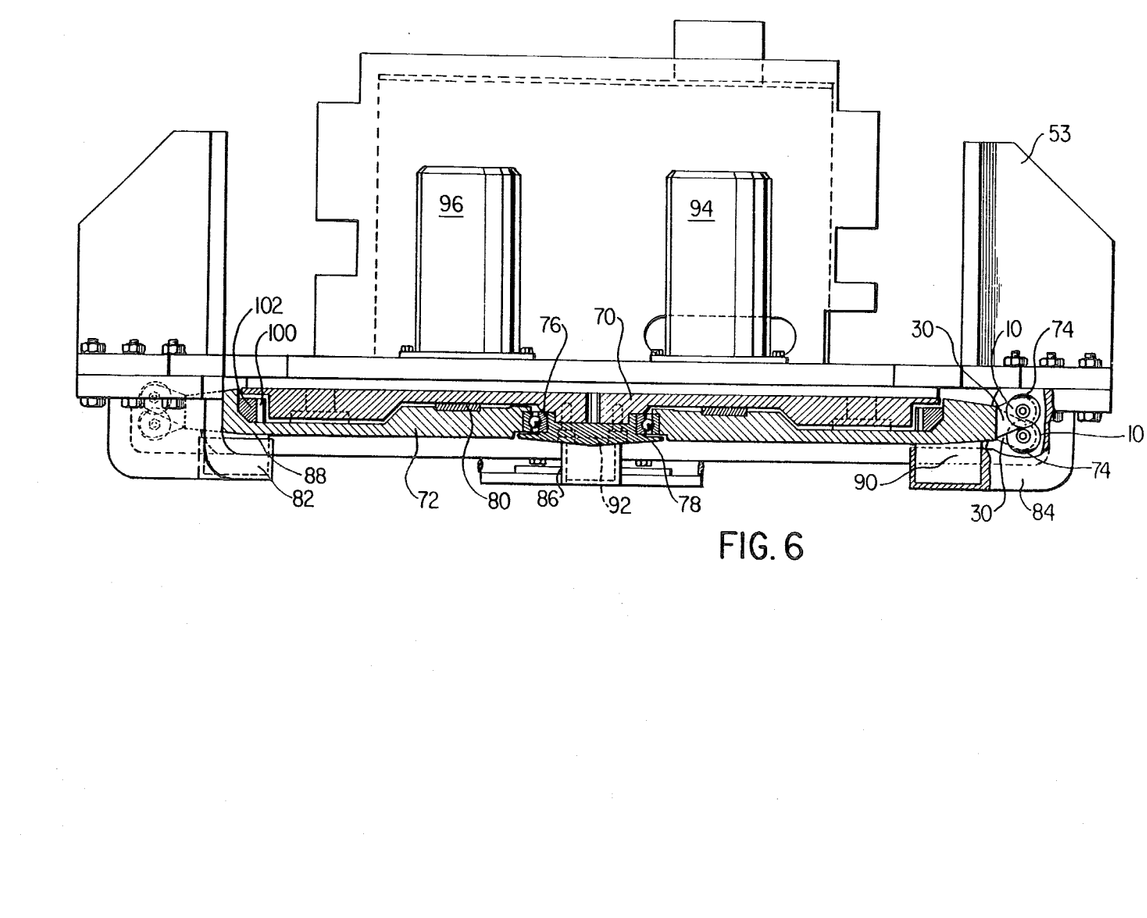
FIG. 6 is a side view of the tree falling head base portion shown in FIG. 5 and includes a sectional side view of the disc saw of FIG. 5 (the scale of FIG. 6 has been enlarged in comparison to the scale of FIG. 5).

Cutting disc 72 rotates around a bearing 76 which is supported by a steel bearing retainer 78. A non-metallic wear ring 80 separates cutting disc 72 from stationary platform disc 70 and absorbs frictional forces therebetween, as well as impact loads imparted to either disc.

Support arms 82, 84, 86 having non-ferrous (i.e. brass) wear pads 88, 90, 92 are suspended from yoke 53 to slidably support the underside of disc 72 as the disc is advanced and retracted with respect to yoke 53. Support arms 82, 84, 86 resist forces which might distort the shape of discs 70, 72 during the tree cutting operation, (such distortion is undesirable because it might allow the saw drive motors to disengage) and also relieve the load on bearing 76. Wear pads 88, 90, 92 must be periodically adjusted by extending them upwards from arms 82, 84, 86 to close the gap between pads 88, 90, 92 and disc 72 caused by wearing of the pads.

Figure 5:
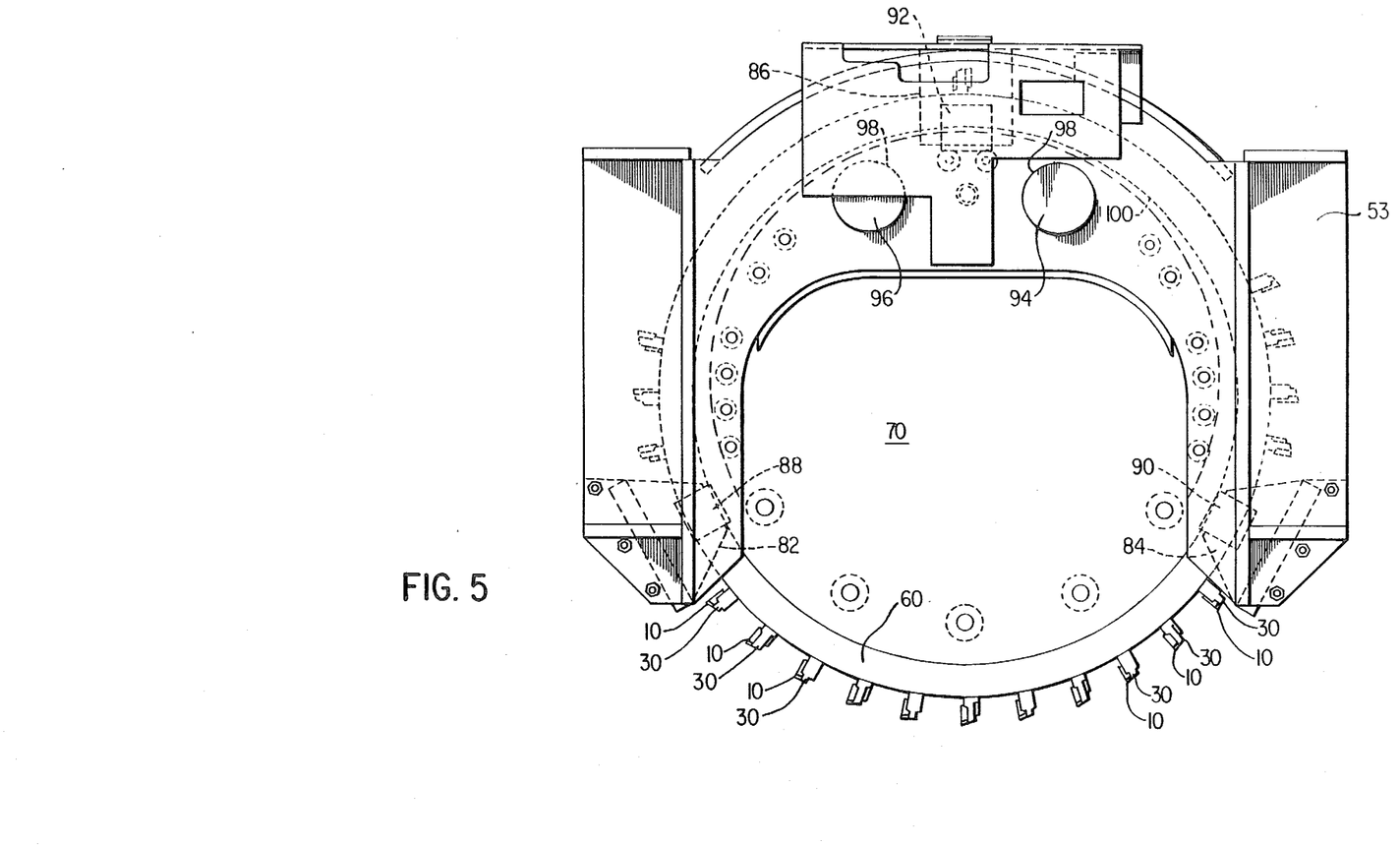
FIG. 5 is a top plan view of the base of the tree falling head of FIGS. 1 through 4D, showing the disc saw thereof.

Cutting disc 72 is rotated by a pair of hydraulic drive motors 94, 96 having drive gears 98 which mesh with an internal spur gear 100 around the internal circumference of a ring 102 set into and rigidly affixed to cutting disc 72.

Drive motors 94, 96 preferably rotate cutting disc 72 at a relatively slow speed of about 1,300 feet per minute. This permits the application of a relatively high drive torque (approximately 4,000 foot-pounds) to cutting disc 72, which in turn tends to limit the wearing abrasion of cutting elements 10 as compared with conventional circular saws rotated at speeds in the 15,000 to 18,000 foot per minute range. The slower cutting speed also reduces significantly the stresses imparted to saw 60 in overcoming the rotational inertia of the saw (which increases with the saw speed) as the rotational plane of the saw is displaced.

Cutting element sharpness is not particularly critical at high drive speeds since the high inertia of the rotating saw usually suffices to cut the tree, although a relatively poor quality cut often results which limits the saleability of the lumber, particularly in foreign markets. A further disadvantage of high speed saws is that vibration problems are often encountered, necessitating careful balancing of the saw. Furthermore, it is usually necessary to continually power a high speed saw, since it can take ten seconds or longer to bring the saw rotation speed up to the 15,000 to 18,000 foot per minute range. By contrast, drive power need only be applied to the saw of the preferred embodiment just prior to commencement of the cutting operation since the saw can very quickly be brought up to the preferred 1,300 foot per minute speed.

Lubricating oil is injected between the rotating discs 70, 72 in the region between drive motors 94, 96. The oil flows from the central disc area toward the outer rim of the discs, thereby tending to flush foreign matter from between the discs.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A cutting assembly for use in a tree faller, said assembly comprising:

a circular disc adapted to have a plurality of cutting elements mounted on the periphery thereof for cutting through the trunk of a tree to fell the tree, a plurality of cutting assemblies mounted in spaced relation around the periphery of said disc, each assembly comprising a holder body fixedly secured to said disc periphery and extending outwardly thereof and a cutter element detachably secured to and supported by said holder body, the holder bodies being disposed to support plural cutting elements protruding above the upper surface of the disc and plural cutting elements protruding below the lower surface of the disc, each said cutter element having a frustoconical outer face tapering axially inwardly and terminating at a bottom end face, and an inner face intersecting said outer face to define a circular cutting edge at the logitudinal end of said cutting element opposite said bottom end face, said inner face sloping inwardly towards the axis of said elements at a greater angle with respect to said axis than said outer face, said holder body having an arcuate recess therein in the end of said holder body opposite the end secured to said disc, said recess having a side surface complementary to said cutter element outer face and an end face engaging said bottom end face of said cutter element, said holder body further having an anvil portion defining an anvil surface at the end face of said recess and complementary to the portion of the cutter bottom end face extending outwardly of said recess end face, and a threaded fastener means extending axially through said cutter element and into said holder body for releasably securing said cutter element to said body.

2. A cutting assembly as set forth in claim 1 wherein said inner face is concave.

3. A cutting assembly as set forth in claim 1 wherein said inner face is frustoconical.

4. A cutting assembly as set forth in claim 1 including a stationary platform above the circular disc with an upper surface for supporting a tree as the tree is being felled, the holder bodies supporting the cutting elements to protrude alternately above the upper surface of the platform and below the lower surface of the circular disc.

5. A cutting element as set forth in claim 1 in which the holder bodies are alternately angled upwardly and downwardly from the periphery of the disc.

6. A cutting assembly for use in a tree feller, said assembly comprising:
- a circular disc adapted to have a plurality of cutting elements mounted on the periphery thereof for cutting through the trunk of the tree to fell the tree;
- a plurality of cutting elements mounted in spaced relation around the periphery of said disc;
- each assembly comprising a holder body fixedly secured to said disc periphery and extending outwardly thereof and a cutter element detachably secured to said holder body;
- each cutter element having a circular cutting face continuously inwardly contoured toward the center of the cutting face;
- the holder comprising an anvil for supporting said cutter element opposite said cutting face and a shoulder projecting above said anvil for supporting said element around at least approximately one quarter of of the outer circumferential surface of said element between said element faces; and
- a stationary platform above the circular disc with an upper surface for supporting a tree as the tree is being felled, the holder bodies being alternately angled upwardly and downwardly from the periphery of the disc so as to support the cutter elements to protrude alternately above the upper surface of the upper platform and below a lower surface of the disc.

* * * * *